(12) United States Patent
Henderson (10) Patent No.: US 6,527,326 B2
(45) Date of Patent: Mar. 4, 2003

(54) TONNEAU COVER AND LOADING RAMP ASSEMBLY

(76) Inventor: Jack V. Henderson, 6118 Dunmore Dr., West Bloomfield, MI (US) 48322

( * ) Notice: Subject to any disclaimer, the term of this patent is extended or adjusted under 35 U.S.C. 154(b) by 0 days.

(21) Appl. No.: 10/055,167

(22) Filed: Oct. 29, 2001

(65) Prior Publication Data

US 2002/0145299 A1 Oct. 10, 2002

Related U.S. Application Data

(60) Provisional application No. 60/245,413, filed on Nov. 2, 2000.

(51) Int. Cl.$^7$ .............................. B62D 33/03; B62P 7/02
(52) U.S. Cl. ...................... 296/61; 296/100.09; 414/537
(58) Field of Search ........................ 296/51, 61, 100.01, 296/100.02, 100.06, 100.08, 100.09; 414/537

(56) References Cited

U.S. PATENT DOCUMENTS

| | | | | |
|---|---|---|---|---|
| 3,737,058 A | * | 6/1973 | Johnson ........................ 296/61 |
| 4,003,483 A | * | 1/1977 | Fulton ........................... 296/61 |
| 4,864,673 A | | 9/1989 | Adaway et al. |
| 4,900,217 A | * | 2/1990 | Nelson ........................ 414/537 |
| 5,244,335 A | | 9/1993 | Johns |
| 5,287,579 A | * | 2/1994 | Estevez, Jr. ................... 296/61 |
| 5,380,141 A | * | 1/1995 | Flowers ....................... 414/462 |
| 5,393,191 A | * | 2/1995 | Alexander ................... 414/537 |
| 5,553,762 A | * | 9/1996 | Brown ......................... 414/537 |
| 5,653,491 A | | 8/1997 | Steffens et al. |
| 5,795,125 A | | 8/1998 | Walkden |
| 5,803,523 A | * | 9/1998 | Clark et al. .................... 296/61 |
| 5,857,729 A | * | 1/1999 | Bogard .................... 296/100.09 |
| 5,961,173 A | | 10/1999 | Repetti |
| 5,971,465 A | * | 10/1999 | Ives et al. ...................... 296/61 |
| 6,042,923 A | * | 3/2000 | Lewis ........................... 296/61 |
| 6,076,215 A | * | 6/2000 | Blankenship et al. ......... 414/537 |
| 6,086,135 A | * | 7/2000 | Bourgeois ............... 296/100.01 |
| 6,106,051 A | * | 8/2000 | Miskowic ............... 296/100.06 |
| 6,129,407 A | * | 10/2000 | Kooiker ................... 296/100.07 |
| 6,227,602 B1 | * | 5/2001 | Bogard .................... 296/100.06 |
| 6,422,635 B1 | * | 7/2002 | Steffens et al. ......... 296/100.09 |
| 6,447,040 B1 | * | 9/2002 | Young, Sr. ..................... 296/61 |

* cited by examiner

Primary Examiner—D. Glenn Dayoan
Assistant Examiner—Greg Blankenship
(74) Attorney, Agent, or Firm—Clark Hill PLC (57) ABSTRACT

A tonneau cover assembly is securable to a vehicle having a cargo bed defined by a pair of opposing sidewalls extending between a fixed forward wall and a movable rear tailgate. The tonneau cover assembly includes a plurality of rigid panels. The panels are securable to the sidewalls for covering the cargo bed. An attachment bracket couples one of the panels to the tailgate to provide a loading ramp that extends between the cargo bed and ground. The tonneau cover assembly includes at least one elongated stiffener bracket that is attachable to the plurality of panels. The elongated stiffener bracket locks the panels in the ramp position during use as a loading ramp to the cargo bed.

13 Claims, 6 Drawing Sheets

TONNEAU COVER AND LOADING RAMP ASSEMBLY

This application claims the benefit of Provisional Application No. 60/245,413, filed Nov. 2, 2000.

BACKGROUND ART

1. Field of the Invention

The invention relates to a tonneau cover and loading ramp device. In particular, this invention relates to a tonneau cover that may be used as a loading ramp device.

2. Description of the Related Art

Pickup trucks are among the most popular vehicles on the market. Accessories for the customization of pickup trucks are becoming increasingly popular as people try to add individual taste and uniqueness to an otherwise common vehicle. However, these accessories may inhibit functionality of the pickup truck. It is beneficial therefore, to provide pickup truck owners accessories that are functional as well as stylish.

Pickup trucks are also known for their versatility in cargo carrying capacity. Tonneau covers are often incorporated which sit on top of the cargo bed of the pickup truck to provide cover storage within the cargo bed. However, tonneau covers inhibit large items from being loaded into the cargo bed. Further, it can be very difficult, due to a high floor height of the cargo bed, to load a pickup truck when the cargo is bulky and/or heavy, such as refrigerators, stoves, all terrain vehicles (ATVs), and the like. Therefore, it would be beneficial if a tonneau cover could be easily removed from the cargo bed and used as a loading ramp for loading large items into the cargo bed and then be stored in the cargo bed so as to minimize the intrusion to the carrying capability of the pickup truck.

U.S. Pat. No. 4,864,673 discloses a folding ramp for a pickup truck. The folding ramp stows in the liftgate of the pickup truck. Therefore, the folding ramp does not have additional use when there is no need to roll an item off the cargo bed onto the ground. The added weight due to the folding ramp is undesirable, especially when the functionality of the folding ramp is used occasionally.

SUMMARY OF THE INVENTION

A tonneau cover assembly is securable to a vehicle having a cargo bed defined by a pair of opposing sidewalls extending between a fixed forward wall and a movable rear tailgate. The tonneau cover assembly includes a plurality of rigid panels. The panels are securable to the sidewalls for covering the cargo bed. An attachment bracket couples one of the panels to the tailgate to provide a loading ramp that extends between the cargo bed and ground. The tonneau cover assembly includes at least one elongated stiffener bracket that is attachable to the plurality of panels. The elongated stiffener bracket locks the panels in the ramp position during use as a loading ramp to the cargo bed.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
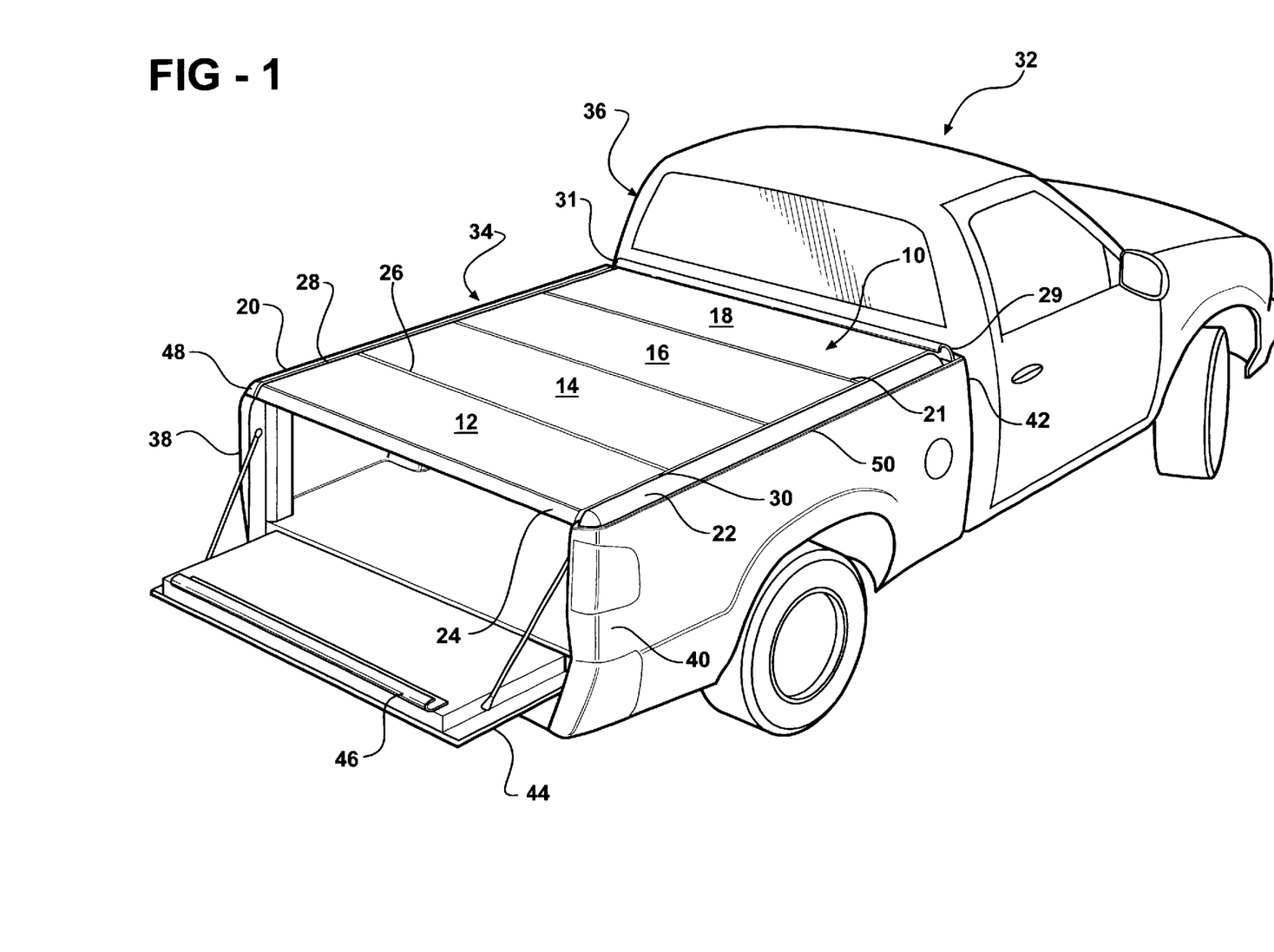
FIG. 1 is an isometric view of the pickup truck with the tonneau cover attached atop the cargo bed.

Referring to FIG. 1, a vehicle is generally shown at 32. The vehicle, a pickup truck 32, has a cargo bed 34 generally extending from behind a passenger cab 36 of the pickup truck 32 and including two opposed and generally parallel sidewalls 38, 40 interconnected and spaced apart by a fixed forward wall 42 and a movable rear tailgate 44. The tailgate 44 has a J-shaped flange 46 attached thereto.

Figure 2:
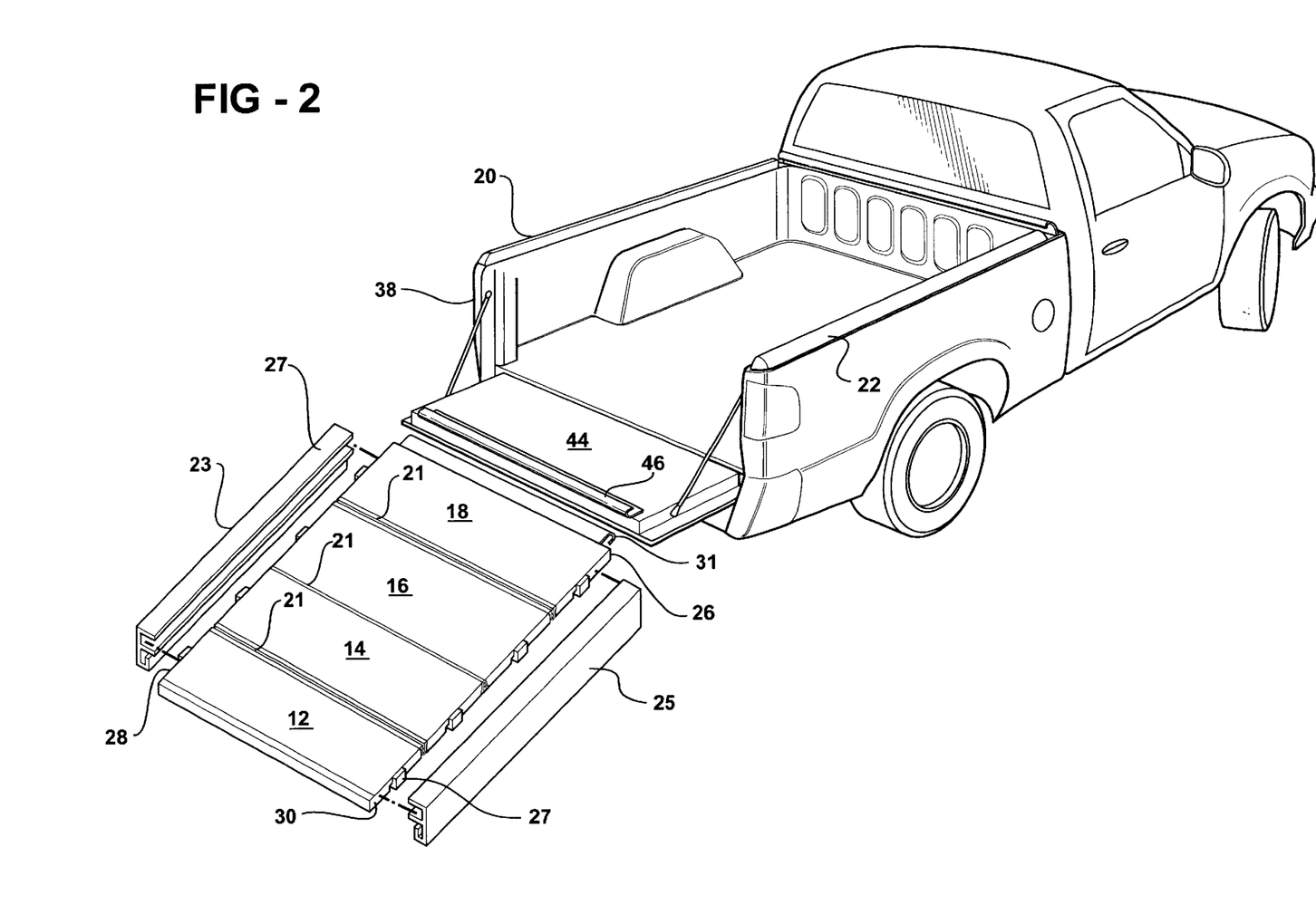
FIG. 2 is a partially exploded isometric view of the pickup truck and the tonneau cover in the ramp position.
Figure 7:
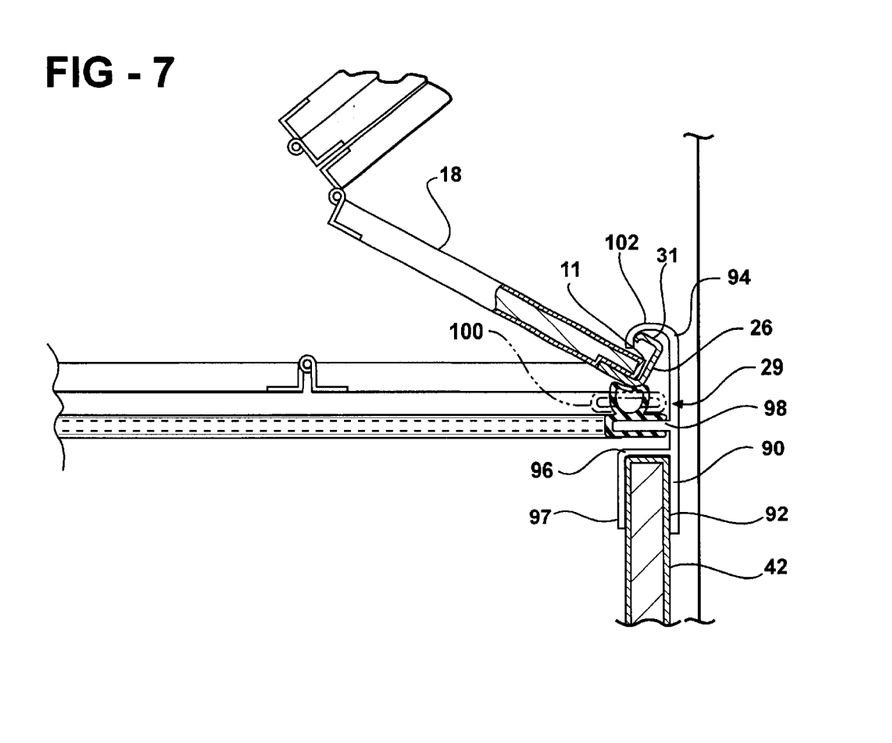
FIG. 7 is a section view of the front bracket and the tonneau cover attaching thereto.
Figure 8:
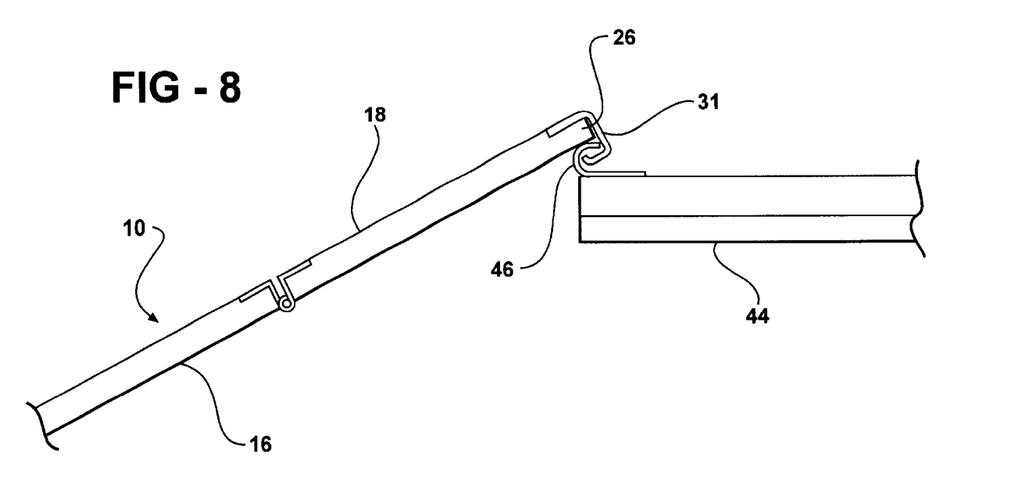
FIG. 8 is a side view of the tonneau cover hooking to the tailgate of the vehicle in the ramp position.

Still referring to FIG. 1, the tonneau cover 10 of the invention is generally illustrated. The tonneau cover 10 generally includes a plurality of panels 12, 14, 16, 18, side brackets 20, 22, a plurality of hinges 21, and a front bracket 29. As shown in FIG. 2, the tonneau cover 10 additionally includes stiffeners 23, 25 and a plurality of latches 27. Referring again to FIG. 1, the panels 12, 14, 16, 18 are comparable in design, therefore one panel 18 will be described. The panel 18 is generally planar and includes front, rear, and opposing side edges 24, 26, 28, 30. The panel 18 is generally solid in construction. The panels 12, 14, 16, 18 may be made of any suitable material such as metal, FRP or other known foam composite constructions. Preferably, the panels 12, 14, 16, 18 are equally sized and have a width less than the width of a cargo bed 34 and have textured surfaces for aiding traction when in use as a loading ramp. The combined length of the panels 12, 14, 16, 18 are such that the cargo bed 34 is fully covered by the tonneau cover 10 when in a covering position as shown in FIG. 1. Additionally, the panel 18 has a J-shaped flange 31 extending upwardly from the rear edge 26 as shown in FIGS. 2, 7, and 8.

Figure 3:
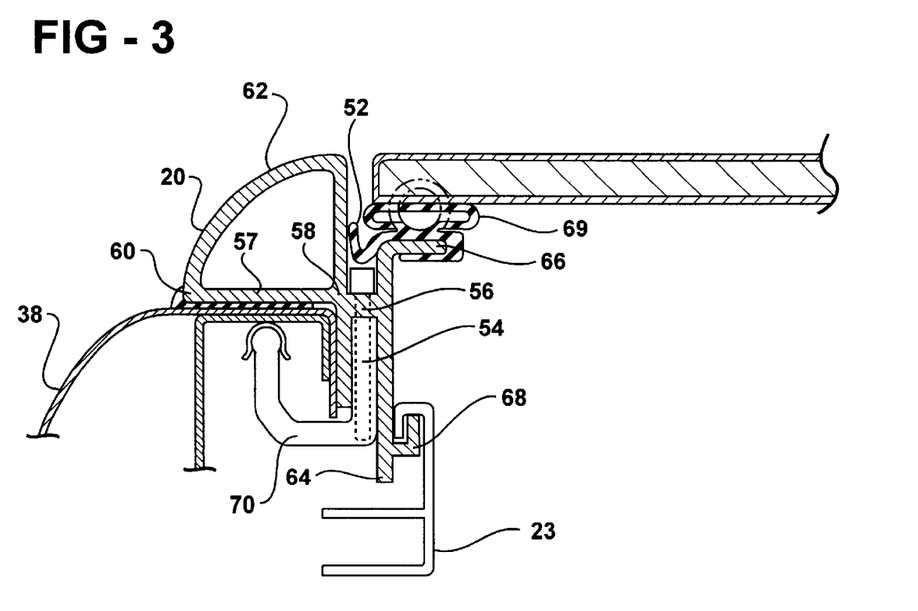
FIG. 3 is a cutaway isometric view of the side bracket attached to the sidewall of the truck with the tonneau cover and the stiffener attached thereto.

Referring to FIG. 2, the side brackets 20, 22 are mirror images of each other. Thus, the invention 10 will be described in relation to the side bracket 20. The side bracket 20 is elongated and extends the length of wall 38. As shown in FIG. 3, the side bracket 20 has a generally H-shaped cross section having two generally vertical walls 52, 54 interconnected by a generally horizontal flange 56. The vertical wall 52 further includes a horizontal flange 57 extending from a first end 58 located at generally the middle of the wall 52 to a second distal end 60. The second distal end 60 is interconnected to the vertical wall 52 by an upwardly arcuate wall 62. The vertical wall 54 has a first end 64 and a second distal end 66. Near the first end 64, an upwardly facing L-shaped flange 68 extends the length of bracket 20. The second end 66 is curved away from wall 52 to approximately a horizontal position for attachment of a bulb seal 69. The side bracket 48 further includes a J-shaped attachment bracket 70 partially positioned between the walls 52, 54 with the lower hook part of the J-shape extending beyond wall 52 for securing the side bracket 48 to the vehicle sidewall 38.

Figure 4:
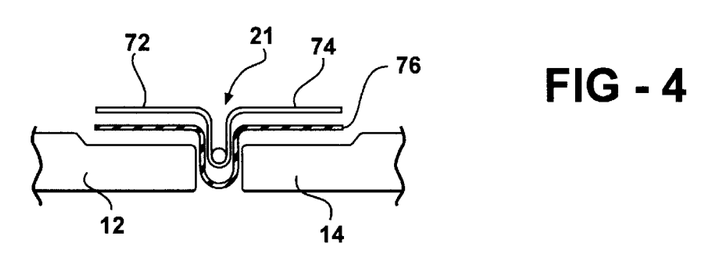
FIG. 4 is a partially exploded section view of the hinge and seal attaching to the tonneau cover.
Figure 5:
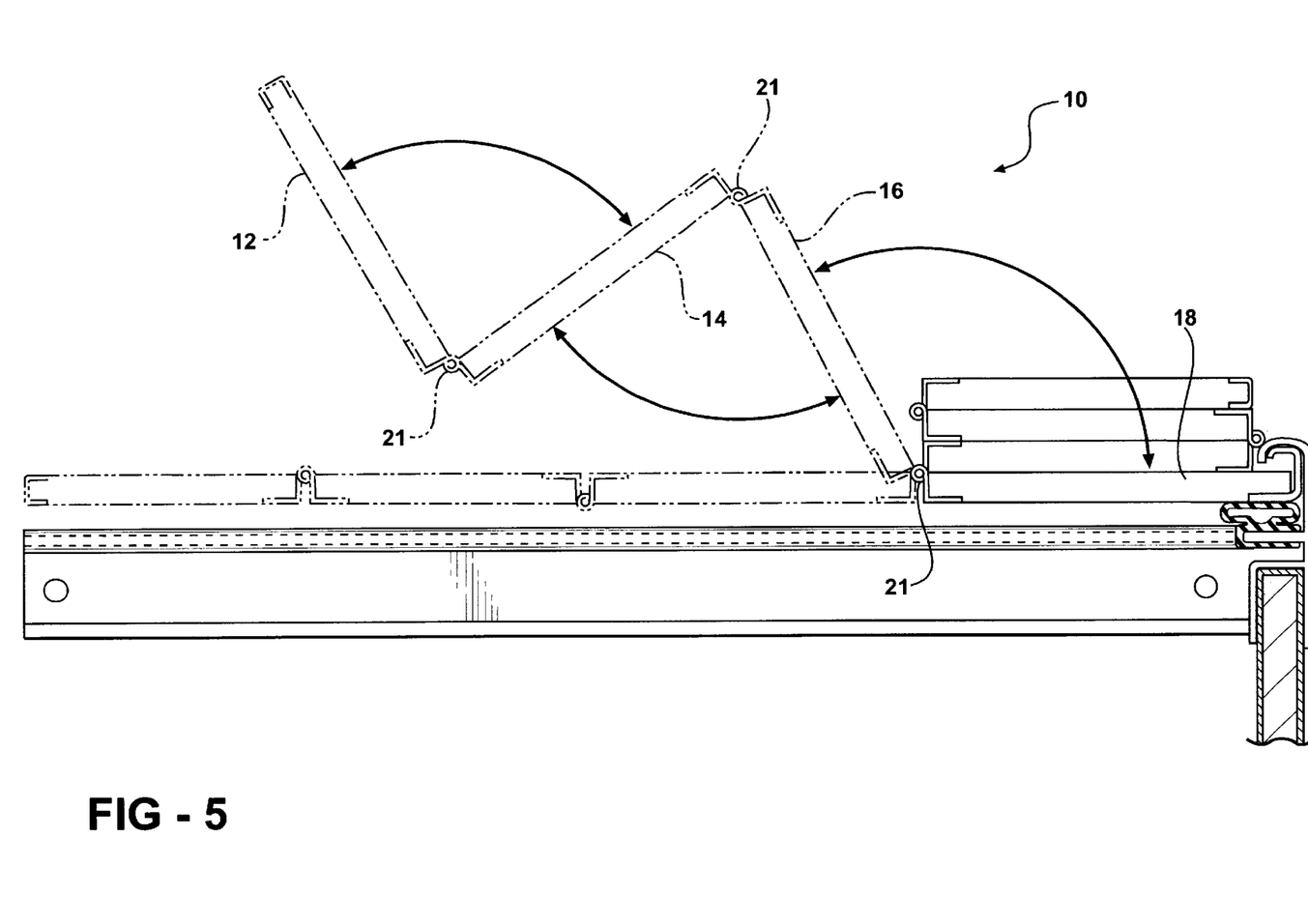
FIG. 5 is a side view with the tonneau cover covering the cargo bed and folding together.

Referring to FIG. 4, the hinges 21 of the tonneau cover 10 are shown in detail. The hinges 21 can be of any type of hinge mechanism, i.e., multiple hinge, piano hinge, or similar, as known to one of ordinary skill in the art. The hinges 21 each include a first bracket member 72 and a second bracket member 74, which are pivotally interconnected. The hinges 21 fixedly attach to and interconnect each of the panels 12, 14, 16, 18 such that the panels 12, 14, 16, 18 may fold on top of one another in a Z-fold fashion, as shown in FIG. 5. Therefore, the panels 12 and 14 will be referenced. Referring again to FIG. 4, a seal 76 including a flexible water resistant material, such as rubber or a like material, is positioned between the hinge 21 and the panels 12, 14 for preventing water from entering the cargo bed 34.

Referring to FIG. 2, the stiffeners 23, 25 have a generally F-shaped cross section and are of a length to cover and surpass the interconnection of the hinges 21 to the panels 12, 14, 16, 18 for strengthening and reinforcement of the hinges 21. More specifically, referring to FIG. 6, the stiffeners 23, 25 include a generally vertical wall 78 extending from a first end 80 to a distal second end 82. The first end 80 of the wall 78 has a generally perpendicular flange 84, which extends therefrom. A similar flange 86 is spaced apart from the flange 84 such that the flanges may be placed over the side edges of the panels 12, 14, 16, 18. The second end 82 includes a J-shaped flange 88 that extends outward of the wall 78 in the same direction as the flanges 84, 86 and opens toward the flanges 84, 86. The flange 88 allows for stowage of the stiffeners 23, 25 along the side brackets 20, 22 by interlocking to the flange 68, as shown in FIG. 3.

Referring to FIG. 2, the latches 27 are shown as attached to panels 12, 14, 16, 18 on edges 28, 30. The latches 27 are identical for each panel 12, 14, 16, 18 along the same edge 28 and are mirror images of the latches 27 on the opposing edge 30. Therefore, the latches 27 will be described referring to panel 12, edge 28 in FIG. 6. The latch 27 is generally L-shaped and is pivotally interconnected to the panel 12. The latch 27 is shown in the open position at A, the latched position at B and the edge position at C. The open position A is for removing and placing the tonneau cover 10 on the cargo bed 34. The latched position B is for locking down the tonneau cover 10 to the side brackets 20, 22. The edge position is for protecting the tonneau cover 10 from the stiffeners 23, 25 when in the ramp position.

As shown in FIG. 7, the front bracket 29 has a generally h-shaped cross-section and is positioned on and extends the length of the forward wall 42. The bracket 29 has a vertical wall 90 including a first end 92 and a second distal end 94. Toward the first end 92, there exists a generally horizontal flange 96, which extends inward of the cargo bed 34, i.e., toward the tailgate 44, then turns downwardly into a generally vertical flange 97 so as to encapsulate the forward wall 42. Furthermore, a second flange 98 is generally spaced evenly between the first end 92 and the second end 94. The flange 98 likewise extends inward for providing support for the tonneau cover 10 and for fixedly attaching a bulb seal 100 for preventing water from entering the cargo bed 34. The second end 94 curves inwardly toward the cargo bed 34 and forms a J-shaped receptacle hook 102 for securing the tonneau cover 10 via the flange 31 located on the panel 18.

Figure 9:
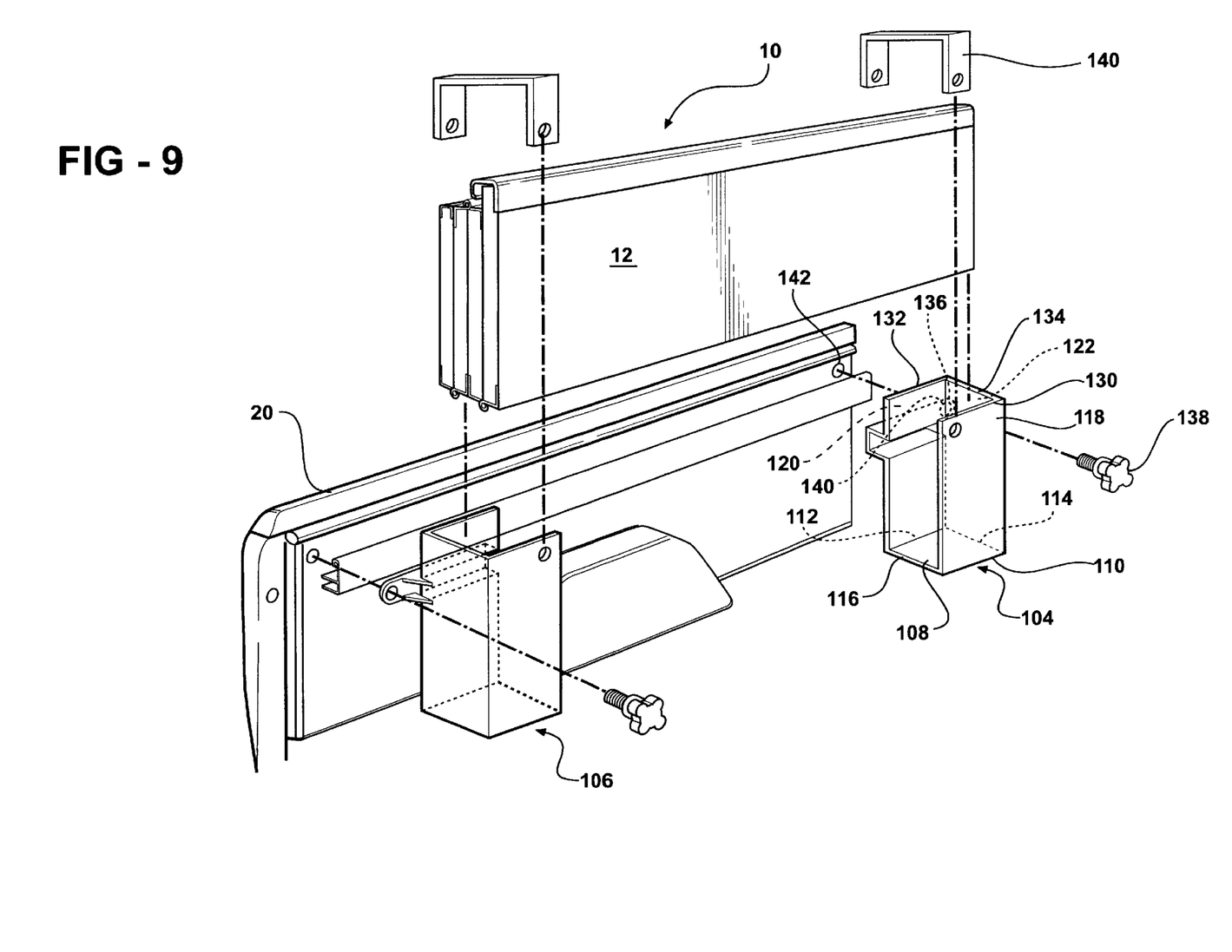
FIG. 9 is a partially exploded view of the tonneau cover storage brackets as attach to the side bracket.

Referring now to FIG. 9, storage brackets 104, 106 are shown. The storage brackets 104, 106 are mirror images of each other and therefore, only the bracket 104 will be described. The bracket 104 has a generally planar rectangular base 108 including front, rear, and opposing side edges 110, 112, 114, 116. Front, rear, and sidewalls 118, 120, 122 extend in a generally vertical direction from the base edges 110, 112, 114 to a distal edge 130, 132, 134. The rear wall 120 includes a tab 136 which projects generally perpendicularly from the rear wall 120 and extends the length of the rear wall 120 and projects beyond the sidewall 122 for attaching the storage bracket 104 to the side bracket 48 via an attachment fastener 138. Specifically, the tab 136 and the side bracket 48 each have a hole 140, 142 which may be aligned for the insertion of the attachment fastener 138. A hole 142 in the side bracket 48 is located in two locations such that each storage bracket 104, 106 may be fastened to the side bracket 48 at distance to allow the tonneau cover 10 to be stowed. The tonneau cover 10 is in the stowed position, as depicted in FIGS. 5 and 9. Furthermore, the attachment fastener 138 is such that it easy allows for the attachment or removal of bracket 104. Additionally, a retainer strap 140 is removably attached to the front wall 118 and the rear wall 120 such that it allows for the vertical retention of the tonneau cover 10 when placed within the storage brackets 104, 106.

Figure 6:
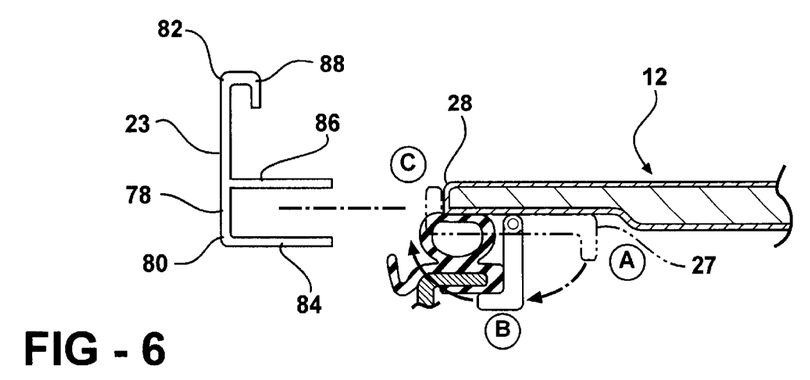
FIG. 6 is a section view of the tonneau cover latch in three positions and the stiffener bracket in relation to the tonneau cover.

In operation, the tonneau cover 10 is shown latched to and covering the cargo bed 34 in FIG. 1. Referring to FIG. 6, the latches 27 on each panel 12, 14, 16, 18 may be released from the corresponding side bracket 48, 50 and rotated into the edge position, as shown at C in FIG. 2 and FIG. 6, for protecting the tonneau cover 10 and creating a flush panel. The panels 12, 14, 16, 18 of the tonneau cover 10 may then be folded together in a consecutive Z-fold fashion along the hinges 21 attached to each panel as shown in FIG. 5. The tonneau cover 10 may be removed from the cargo bed 34, as shown in FIG. 7 and the tailgate 44 may be lowered into an open position as shown in FIG. 2. The tonneau cover 10 may then be inverted and the flange 31 on panel 18 is engaged with the corresponding flange 46 of the tailgate 44 as shown in FIG. 8. The tonneau cover 10 may then be unfolded and extended downwardly to the ground as shown in FIG. 2. It should be appreciated by those skilled in the art that ground is whatever surface to which the tonneau cover 10 may extend, depending on the location of the pickup truck 32. The stiffeners 23, 25 may be removed from the sidewall brackets 18, 20 and engaged along the opposing side edges 28, 30 of the panels 12, 14, 16, 18. Specifically, the flanges 84, 86 of the stiffeners 23, 25 are placed over the side edges 28, 30 of the panels 12, 14, 16, 18 and across each hinge 21 interconnecting the panels 12, 14, 16, 18 to form a single rigid panel for use as a loading ramp between the tailgate 44 and the ground or other surface adjacent the tailgate 44.

Alternatively, when the tonneau cover 10 is folded and removed from the cargo bed 34, the tonneau cover 10 may be stowed between the storage brackets 104, 106 which may be attached to the side bracket 48, as shown in FIG. 9. More specifically, the storage brackets 104, 106 are positioned such that the opening in the tab 136 and the opening in the side bracket 48 align and the tab 136 is resting on flange 68 of the side bracket 48. The attachment fastener 138 is then inserted through both openings and secures the storage brackets 104, 106 to the side bracket 48. The tonneau cover 10 may be placed in the storage brackets 104, 106 and the retainer strap 140 is connected to the rear walls and front walls 118, 120 of the storage brackets 104, 106 for stowing the tonneau cover 10 therein.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A tonneau cover assembly securable to a vehicle having a cargo bed defined by a pair of opposing sidewalls extending between a fixed forward wall and a movable rear tailgate, said tonneau cover assembly comprising:

a plurality of rigid panels adapted to be secured to the sidewalls for covering the cargo bed in a covering position;

an attachment bracket coupled to one of said plurality of panels adapted to be secured to the tailgate of the cargo bed with said plurality of panels in a ramp position for providing a loading ramp extending between the cargo bed and ground; and at least one elongated stiffener bracket attachable to each of said plurality of panels for locking each of said plurality of panels in said ramp position during use as a loading ramp to the cargo bed.

2. A tonneau cover assembly as set forth in claim 1 including a hinge assembly interconnecting each of said plurality of panels for folding said panels between a stowed position in overlapping relationship and said ramp position in planar alignment.

3. A tonneau cover assembly as set forth in claim 2 including side brackets for receiving and holding said plurality of panels in said covering position wherein each of said plurality of panels extend through a single plane and abut each other to prevent access to the cargo bed of the vehicle.

4. A tonneau cover assembly as set forth in claim 3 wherein each of said plurality of panels includes a latch for selectively securing said elongated stiffener bracket thereto.

5. A tonneau cover assembly as set forth in claim 4 wherein said latch is L-shaped.

6. A tonneau cover assembly as set forth in claim 5 wherein said latch is pivotal between three positions, each of said three positions corresponding to each of said positions said tonneau cover assembly may be operating.

7. A tonneau cover assembly securable to a vehicle having a cargo bed defined by a pair of opposing sidewalls extending between a fixed forward wall and a movable rear tailgate, said tonneau cover assembly comprising:

a plurality of rigid panels adapted to be secured to the sidewalls for covering the cargo bed in a covering position;

an attachment bracket coupled to one of said plurality of panels adapted to be secured to the tailgate of the cargo bed with said plurality of panels in a ramp position for providing a loading ramp extending between the cargo bed and ground;

an elongated stiffener bracket attachable to each of said plurality of panels for locking each of said plurality of panels in said ramp position during use as a loading ramp to the cargo bed; and a storage bracket fixedly secured to one of the sidewalls of the vehicle for storing plurality of rigid panels and said elongated stiffener bracket when said plurality of rigid panels and said elongated stiffener bracket are not in use.

8. A tonneau cover assembly as set forth in claim 7 wherein said storage bracket includes a retainer strap for retaining said plurality of rigid panels bracket therein during non-use thereof.

9. A tonneau cover assembly as set forth in claim 8 including attachment fasteners for securing said elongated stiffener bracket to said storage bracket.

10. A tonneau cover assembly as set forth in claim 9 including a hinge assembly interconnecting each of said plurality of panels for folding said panels between a stowed position in overlapping relationship and said ramp position in planar alignment.

11. A tonneau cover assembly as set forth in claim 10 including side brackets for receiving and holding said plurality of panels in said covering position wherein each of said plurality of panels extend through a single plane and abut each other to prevent access to the cargo bed of the vehicle.

12. A tonneau cover assembly as set forth in claim 11 wherein each of said plurality of panels includes a latch for selectively securing said elongated stiffener bracket thereto.

13. A tonneau cover assembly as set forth in claim 12 wherein said latch is L-shaped.

* * * * *

UNITED STATES PATENT AND TRADEMARK OFFICE
CERTIFICATE OF CORRECTION

PATENT NO. : 6,527,326 B2
DATED : March 4, 2003
INVENTOR(S) : Henderson

It is certified that error appears in the above-identified patent and that said Letters Patent is hereby corrected as shown below:

Column 2,
Line 17, delete "attach" and insert -- attached -- therefor.
Line 54, delete "wall" and insert -- sidewall -- therefor.
Line 64, insert -- side -- between "of" and "bracket".
Line 66, delete "The" and insert -- A -- therefor.

Column 3,
Line 32, insert -- J-shaped -- between "The" and "flange".

Column 4,
Line 15, insert -- a -- between "at" and "distance".

Column 5,
Line 30, delete "extend" and insert -- extends -- therefor.
Line 31, delete "abut" and insert -- abuts -- therefor.

Column 6,
Line 16, insert -- said -- between "storing" and "plurality".
Line 22, delete "bracket".
Line 35, delete "extend" and insert -- extends -- therefor.
Line 36, delete "abut" and insert -- abuts -- therefor.

Signed and Sealed this

Fifth Day of August, 2003

JAMES E. ROGAN
*Director of the United States Patent and Trademark Office*